United States Patent [19]

Fiorentini

[11] Patent Number: 4,823,992
[45] Date of Patent: Apr. 25, 1989

[54] METERING DEVICE FOR FEEDING LIQUIDS TO A MIXING HEAD

[75] Inventor: Carlo Fiorentini, Saronno, Italy
[73] Assignee: AFROS S.p.A., Varese, Italy
[21] Appl. No.: 90,070
[22] Filed: Aug. 27, 1987
[30] Foreign Application Priority Data
    Sep. 3, 1986 [IT] Italy .................... 21581 A/86
[51] Int. Cl.⁴ .................................. G01F 11/02
[52] U.S. Cl. ........................... 222/333; 222/372; 222/390; 92/33
[58] Field of Search .............. 222/390, 333, 372; 92/113, 33, 31

[56] References Cited

U.S. PATENT DOCUMENTS

| | | | |
|---|---|---|---|
| 500,035 | 6/1893 | Pfenning | 222/390 X |
| 1,951,504 | 3/1934 | Morris | 222/390 |
| 2,172,517 | 9/1939 | Papini | 222/390 X |
| 3,390,815 | 7/1968 | Kavan et al. | 222/390 X |
| 3,989,223 | 11/1976 | Burkhardt et al. | 92/113 X |
| 4,116,112 | 9/1978 | Hampejs | 92/113 X |
| 4,485,725 | 12/1984 | Tootle | 92/33 X |
| 4,653,675 | 3/1987 | Ratzky | 222/390 |

*Primary Examiner*—Joseph J. Rolla
*Assistant Examiner*—Nils E. Pedersen
*Attorney, Agent, or Firm*—Cushman, Darby & Cushman

[57] ABSTRACT

A metering device for feeding liquids, in particular chemical components for the production of polyurethane mixtures in a high-pressure mixing head.

The device comprises at least a first and a second metering unit of the type having a cylindrical chamber in which a plunger slides to displace a pre-established volume of liquid during its stroke and to feed it to the mixing head. The plunger is connected to a worm screw control device, in which the worm screw control devices of the metering units are interconnected by a mechanical drive actuated by a driving motor; one or more revolution variators can be disposed in the mechanical interconnecting transmission in order to vary the ratios between the speeds of the plungers and, therefore, the quantities metered in relation to the stochiometric ratios between the liquids to be mixed.

8 Claims, 2 Drawing Sheets

METERING DEVICE FOR FEEDING LIQUIDS TO A MIXING HEAD

BACKGROUND OF THE INVENTION

This invention relates to a metering device for metering and feeding liquids to be mixed, in particular for metering and feeding chemical components which are capable of reacting according to precise stoichiometric ratios, for example, to form polyurethane mixtures to be fed into a mold.

It is well known to feed stochiometrically proportioned quantaties of liquids which react chemically together, for example, a polyol and an isocynate, to a high-pressure mixing head, in which the jets of chemical components are impinged together in a mixing chamber where they are mixed and then fed into a mold; it is also known to provide means for varying and controlling the feeding of one or more components to allow them to be mixed in the correct stochiometric ratios.

Among the various feeding systems currently known, reference is made here to the systems which make use of "absolute" pumping units, that is to say, in the form of cylinders in which a plunger or piston is made to reciprocate in a chamber in order to move, with its stroke, a precise pre-established quantity or volume of liquid; feeding and metering units of this kind are illustrated for example in the IT-A- No. 23119 A/85 of the same applicant, in the DE-A- No. 3309964, in the U.S. Pat. No. 3,912,234 or in the U.S. Pat No. 3,642,175. In all these known devices, the metering units are hydraulically actuated by a source of fluid under pressure and are controlled by means of complex hydraulic or electric systems in order to ensure that the components are fed and mixed in the necessary stoichiometric quantities. However, the use of hydraulic or electric systems for controlling the quantities of liquid fed, which operate in relation to a constantly-sensed physical quantity such as the forward velocity of the plungers of the metering unit, the flow rates and so on, gives rise to margins of error in the metering which depend upon the control system used and which, in any case, call for subsequent operations and adjustments in order to obtain and keep the flow rates in the desired stoichiometric ratios.

From U.S. Pat. No. 2,890,836 and U.S. Pat. No. 3,642,175, there are also known mixing devices, which make use of volumetric pumps or positive pumping devices, interconnected mechanically together; the U.S. Pat. No. 3,642,175 refers to a device for making protective coverings in which the control of the stoichiometric reaction ratios between the components is less critical than in the case of molding mechanical articles having characteristics which must be strictly controlled; consequently, the use of volumetric pumps, with nonabsolute relative efficiencies, even though they are mechanically correlated, does not solve the problem of strict control of the stoichiometric mixing ratios due to the fact that the efficiencies of the pumps differ from one another and may vary with use.

In the U.S. Pat. No. 3,642,175, two feeding cylinders are operated in opposition to each other by means of a rocking rod to feed one component, at a time, at low pressure, into a mixing chamber containing an impeller. If the proposed solution were to be used for feeding several components simultaneously into a high-pressure mixing head, it would require an extremely complicated structure and the use of particular expedients to withstand the considerable stress generated by the chemical components which are usually fed at pressures equal to or over 200 bars.

The result would be an expensive and extremely cumbersome device. Furthermore, a problem common to all the known devices, and especially to those which make use of hydraulically-operated piston pumps, resides in the control of the stoichiometric ratios for the mixing of the various components, which must be carried out with means that are extremely easy to set, which do not require any further adjustment, and which are smooth-running and reliable.

A further problem arising in the known devices concerns the use of means for controlling the plungertype feeding metering units, with which it is possible to achieve a constantly correlated displacement of the plungers of all the feeding units, which are not negatively affected by the parameters of the system, and with which it is also possible to vary the stoichiometric ratios for feeding one or more components, with extremely simple and highly reliable means, so as not to give rise to additional causes of error.

Consequently, the scope of this invention is to provide a device for metering and feeding liquids, as referred to, in order to solve the above-mentioned problems, which is both extremely simple in structure and highly reliable, and which ensures a constant instantaneous control of the quantities fed and of the stoichiometric ratios between the chemical components to be mixed.

A further scope of this invention is to provide a device of the aforementioned type, which can be actuated by a drive motor which has an extremely low energy consumption and installed power, while at the same time ensuring excellent performances and the pressures necessary for feeding the various components to be mixed.

A still further scope of this invention is to provide a device for metering and feeding reactive chemical components to be mixed in a high-pressure mixing head, which is structurally simple and inexpensive, providing performances equal to those obtained with the previously used devices.

By using mechanical control means, according to this invention, which are mechanically interconnected directly to each other, to control metering units of the piston or plunger type capable, that is, of providing an absolute dosage of the chemical components, in which the volume of liquid displaced by the plunger during its forward stroke corresponds at all times to the exact quantity of liquid delivered, it is possible to achieve a precise and constant control of the ratios between the components and to obtain a mixture of components in the correct stoichiometric ratio, which remains constant and independent of any operating parameter of the device.

SUMMARY OF THE INVENTION

According to a first embodiment of the invention, a metering unit is provided for a device for feeding and metering liquid components in a high-pressure mixing head, which is characterized by the fact of comprising in combination: a metering device having a chamber defined by cylindrical walls, said chamber having at least one aperture for the flow of a component, a plunger member movable in said chamber and guide means for guiding the plunger, said guide means being axially aligned with said metering chamber; a lead screw control device to reciprocate the plunger in the metering chamber and through the guide member, and means for preventing the lead screw from rotating during the sliding movement of said plunger. According to a further embodiment of the invention, a device is provided for metering and feeding chemical components to be mixed in a high-pressure mixing head, comprising at least a first and a second metering unit for feeding the individual components to be mixed, each metering unit comprising a chamber and a reciprocable plunger movable in said chamber, said chamber being connected to a tank containing a component and, respectively, to an inlet conduit for the component in the mixing head, and control means for simultaneously moving the plungers of said metering units, in which the plunger of each metering unit is connected to a respective lead screw control device and in which the screw control devices are interconnected by means of a mechanical gearing operated by a driving motor.

The mechanical gearing interconnecting the worm screw devices optionally comprises adjusting means for varying the transmission ratio for at least one of the aforesaid worm screw devices, and consequently for varying the ratios between the fed quantities of the components to be mixed.

BRIEF DESCRIPTION OF THE DRAWINGS

The invention will be described in greater detail hereunder, with reference to the figures of the accompanying drawing, in which.

DESCRIPTION OF THE INVENTION

Figure 1:
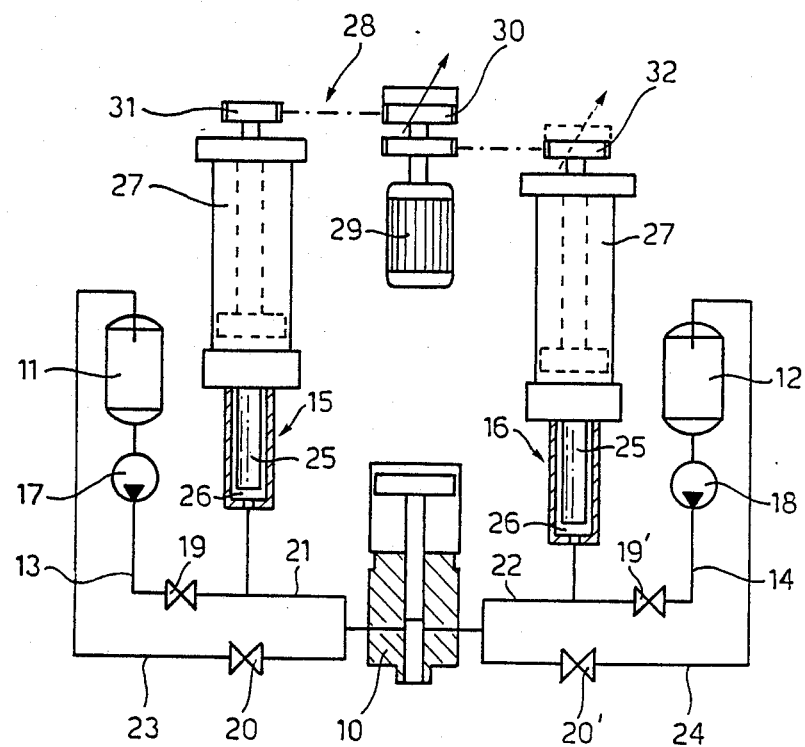
FIG. 1 shows a schematic representation of the device according to this invention, for metering and feeding two chemical components to a high-pressure mixing head.

In FIG. 1 a mixing head 10, of the high-pressure type, is fed with two chemical components to be mixed before being fed into a mold. The components to be mixed are contained in respective tanks 11 and 12 each of which is connected by a system of ducts 13, 14, 21, 22, 23 and 24 to the mixing head 10 and to a respective feeding and metering unit 15, 16, an embodiment of which is shown in detail in FIG. 2. References 17, 18 indicate pumping units for recycling the components, while references 19, 19' and 20, 20' indicate a set of valves for controlling the flow of components from the tanks 11, 12 to the metering units 15, 16 and the mixing head 10 through the duct system shown.

Each metering unit 15 and 16, in the schematic representation of FIG. 1, is therefore connected by means of ducts 21, 22 to an inlet conduit for the component in the mixing head 10, and is respectively connectable to the ducts 23, 24 in order to recycle the components to their respective tanks.

Each metering unit 15, 16 for feeding the components to be mixed is of the plunger type and comprises a plunger or piston 25 axially sliding in a chamber 26 of greater diameter having peripheral walls so that the plunger 25 and chamber 26 together constitute a so-called "absolute pump" in which the quantity of liquid dispensed is, at all times, closely related to the stroke of the same plunger, that is to say, to the volume of liquid displaced.

Figure 2:
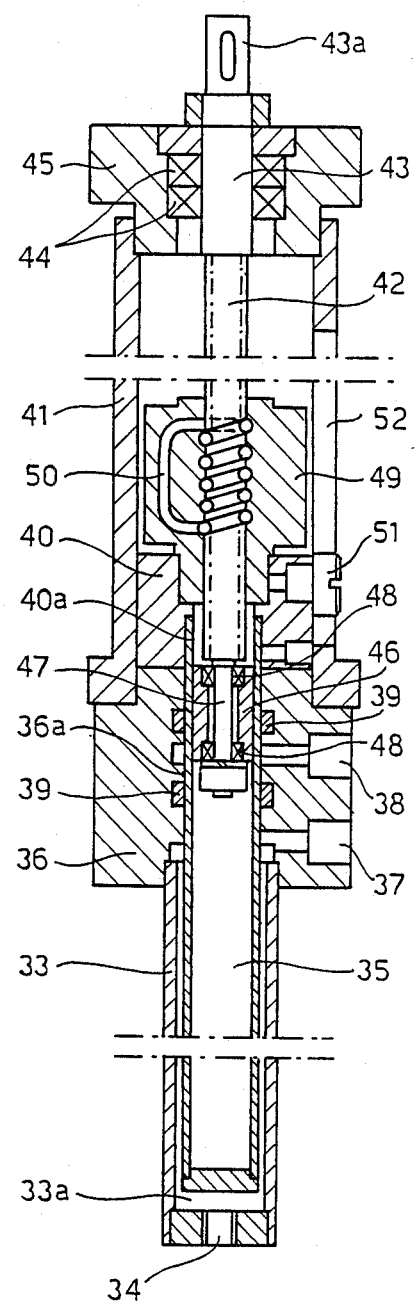
FIG. 2 shows a longitudinal cross-sectional view of a preferred embodiment of a feeding and metering unit, forming part of the invention.

The plunger 25 of each metering unit 15 and 16, as shown in the detail of FIG. 2, is directly connected to a mechanical control device 27 of the lead screw type, in which the mechanical control devices themselves, for example the shafts of the worm screws, are interconnected or interlocked together by a mechanical gearing 28 which in turn connected to a power unit which, in this specific case, is represented in the form of a single electric motor 29. The combination of the mechanical gearing 28 with the worm control type devices 27, in this specific case, carries out various different correlated functions and precisely: a driving function for transmitting the movement from the motor 29 to the plungers 25 to the two metering units, the function of determining the stochiometric ratios for the chemical components, the function of interlocking one metering unit to the other for constantly maintaining the ratios between the forward speeds of the plungers, which, in combination with a plunger-type metering unit, permits instantaneous and constant reciprocal interlocking between the units 15 and 16 and, therefore, absolute assurance of maintaining stoichiometrical ratios related to mechanical parameters which remain unchanged and unaffected by other structural or functional parameters of the system. The mechanical gearing 28 can be of the constant transmission ratio type, in which case if it is required to modify the stoichiometric mixing ratios, that is to say, the metered quantities, it is necessary to modify the gearing itself by replacing one or more gearing members or, as shown schematically, the gearing 28 could be of the adjustable type, by providing for example an adjustable revolution variator 30 connected to the gear 31 for the worm screw of one of the metering units 15, and optionally, a second adjustable revolution variator 32, connected directly or indirectly like the first one, to the shaft of the worm screw of the other metering unit 16.

A particular embodiment of the feeding and metering unit assembly with its relative worm screw control device is shown in the cross-sectional view of FIG. 2. This solution proves to be particularly suitable for reducing the overall dimensions and power loss to a minimum; moreover, the plunger is suitably guided and kept centered throughout its entire stroke. As shown, the feeding and metering unit in FIG. 2 comprises a cylindrical chamber 33a defined by an outer wall 33 having an aperture 34 at its fore end. Sliding within the chamber 33a is a plunger 35 which in turn consists of a hollow cylindrical body closed at its fore end and having an external diameter slightly smaller than the internal diameter of the chamber 33a. The plunger 35 is axially aligned with and slides within a through hole 36a in a guide block or body 36 to which the metering chamber 33a is secured, for example, welded; the body 36 is provided with an aperture 37 which communicates with the rear end of the metering chamber 33a, and respectively with a set of gaskets 39 and ducts for circulation of a sealing fluid. The plunger 35 is secured, for example, screwed onto a connecting element 40 sliding within a hollow cylindrical body 41 secured to the block 36 and disposed coaxially to the metering chamber 33a, on the opposite side of the latter; the element 40 is provided with a through hole 40a. Inside the guide cylinder 41 is a worm screw control device comprising a worm screw 42 rotatingly supported coaxially to the cylinder 41 and passing through the hole 40a in the element 40. An extension 43 of the worm screw 42 is rotatingly supported, by means of thrust bearings 44, by an end plate 45 closing the cylinder 41, a portion 43a of said extension protruding from the end plate 45 on which protruding portion 43a is keyed a gear 31 of the mechanical gearing 28. The screw 42 is supported and kept centered at its other end by means of a rotating and sliding member such as, for example, a bush 46 rotatingly supported by an extension shank 47 of the screw 42, by means of roller bearings 48. Since the bush 46 is situated in correspondence with the hole 36a in the body 36, it serves as a supporting and centering element for the screw 42, and at the same time also carries out the additional function of guiding and centering the plunger 35 of the aforementioned metering unit.

The reciprocating movement of the plunger 35 is obtained by means of a lead screw 49 which is fixed, for example, screwed onto the end of the connecting element 40 opposite that of the plunger 35. The lead screw 49 is preferably of the ball bearing type being provided with suitable grooves for circulation of the balls. In order to prevent the plunger 35, the element 40 and the lead screw 49 from rotating during their longitudinal movement, retaining means have been provided comprising, for example, a pin or a screw 51 protruding from one side of the element 40 and sliding along a lateral groove 52 in the wall of the cylinder 41; it is obvious however that other solutions are possible without prejudice to the innovatory features of this invention. The aforementioned device operates as follows: the mixing chamber of the head 10 is initially closed, the plungers 25 of the two metering units 15, 16 are all pushed forward in their respective metering chambers 26, while each component is made to circulate through the system of valves and ducts 13, 19, 21, 20, 23 and 14, 19', 22, 20', 24 in the device. By means of the motor 29 and the gearing 28, the screws 42 of both the metering units 15 and 16 are made to move, thus causing the plungers 25 to move backwards simultaneously and the metering chambers 26 to fill up with their respective components to be mixed. When the plungers have reached the end of their stroke, this condition is detected by special sensors, not shown; the tow metering units are now full and the mixing of the components can now begin. Consequently, after having suitably actuated the valves 19, 20, 19', 20' in the recycling and feeding ducts 13, 14, 23 and 24, to prevent backflow of the components, and after having first brought the components in the metering chambers up to the required pressure, by reversing the control of the plungers 25 of the metering units, the mixing chamber of the head 10 opens and the plungers are made to move forward simultaneously at the desired speed by an amount corresponding to part of or the entire stroke of the metering chambers, thereby feeding the components simultaneously into the head 10 in the controlled quantities which are kept constant and in precise stochiometric ratios for the entire mixing time. After having completed a mixing operation, the plungers are made to stop and the movement reversed in order to fill the metering chambers as described previously whenever they are completely empty, or to make them move forward again for a subsequent mixing operation whenever the chambers 16 still contain sufficient quantities of components to be mixed. During each feeding or mixing cycle, thanks to the structural and operating features of the described device, that is to say, thanks to the combination of mechanically-interlocked plunger-type absolute metering devices actuated mechanically by means of a worm -lead screw control member, it is possible to control with the utmost accuracy both the quantities fed and the exact stoichiometric mixing ratios, with considerably lower and even negligible tolerances compared to those obtained with the known systems. This control and reliability of the stochiometric mixing ratios is achieved constantly throughout the entire mixing operation; moreover, by suitably selecting the transmission ratios, and the pitches of the worm screws and the connecting gearings, it is possible to obtain accurate doses of even very small quantities, where even slight differences in feeding the components could very easily give rise to the formation of faulty products.

What is claimed is:

1. A metering unit for feeding and metering chemical components to be mixed in a high-pressure mixing device comprising in combination a pumping unit and a control device, said pumping unit including means defining a cylindrical chamber, said control device comprising spaced apart first and second supporting members and an intermediate frame member interconnecting said first and second supporting members, said second supporting member having means defining a cylindrical aperture extending therethrough leading to said cylindrical chamber and being axially aligned therewith, said cylindrical chamber comprising a metering chamber defined by cylindrical walls, said metering chamber including means defining at least one aperture opening therein for permitting the flow of a component, a plunger axially reciprocable within said cylindrical aperture and said metering chamber, said plunger including means defining an axially extending hollow portion, said cylindrical aperture including guide means for guiding the plunger, a worm screw operatively connected to said control device, said worm screw having first and second ends with said first end being rotatably supported at said first supporting member, means for rotatably supporting said second end within the hollow portion of said plunger, said control device further including a lead screw operatively connected to said worm screw and movable within said frame member, means for connecting said lead screw to said plunger and means for preventing the lead screw from rotating during movement of said plunger.

2. A metering unit as claimed in claim 1 wherein said intermediate frame member comprises a cylindrical chamber.

3. A metering unit as claimed in claim 1 wherein said worm screw is axially aligned with said plunger.

4. A metering unit as claimed in claim 1 wherein said means for rotatably supporting said second end of said worm screw includes means defining a bushing rotatably mounted to said worm screw and slidably mounted within said plunger.

5. A metering unit as claimed in claim 1 wherein said lead screw is of the ball bearing type.

6. A metering unit as claimed in claim 1 wherein said guide means and said rotatable support means for said second end are coaxially aligned and at least a portion of said guide means overlaps said rotatable support means for said second end.

7. A metering unit as claimed in claim 1 wherein said rotatable support means for said second end is positioned so that it is positioned horizontally within the confines of said cylindrical aperture when said plunger lies fully within said metering chamber.

8. A metering unit as claimed in claim 1 wherein lead screw is comprised of a first portion operatively engaged with said worm screw and a second portion in sliding engagement with said intermediate frame member.

* * * * *